United States Patent
Yin (10) Patent No.: US 10,429,084 B2
(45) Date of Patent: Oct. 1, 2019

(54) HEAT PUMP WATER HEATER

(71) Applicant: A. O. Smith Corporation, Milwaukee, WI (US)

(72) Inventor: Jianmin Yin, Racine, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 149 days.

(21) Appl. No.: 15/438,350

(22) Filed: Feb. 21, 2017

(65) Prior Publication Data

US 2018/0238561 A1 Aug. 23, 2018

(51) Int. Cl.
| | |
|---|---|
| *F24C 1/00* | (2006.01) |
| *F24D 17/00* | (2006.01) |
| *F24H 4/04* | (2006.01) |
| *F24H 9/00* | (2006.01) |
| *F24D 17/02* | (2006.01) |
| *F24D 19/10* | (2006.01) |
| *F28F 9/02* | (2006.01) |
| *F28D 7/02* | (2006.01) |
| *F28D 20/00* | (2006.01) |

(52) U.S. Cl.
CPC ......... *F24D 17/0036* (2013.01); *F24D 17/02* (2013.01); *F24D 19/1054* (2013.01); *F24H 4/04* (2013.01); *F24H 9/0021* (2013.01); *F28D 7/024* (2013.01); *F28D 20/0039* (2013.01); *F28F 9/0273* (2013.01); *F24D 2200/08* (2013.01); *F24D 2200/123* (2013.01); *F28D 2020/0069* (2013.01); *Y02B 10/20* (2013.01); *Y02B 10/70* (2013.01)

(58) Field of Classification Search
None
See application file for complete search history.

(56) References Cited

U.S. PATENT DOCUMENTS

| | | | | |
|---|---|---|---|---|
| 1,451,863 A | * | 4/1923 | Clark | F24H 1/202 |
| | | | | 122/19.1 |
| 2,308,765 A | * | 1/1943 | Mango | F22B 1/284 |
| | | | | 392/357 |
| 2,376,537 A | * | 5/1945 | Hall | F24H 1/202 |
| | | | | 392/452 |
| 2,784,291 A | * | 3/1957 | Harney | F24H 1/202 |
| | | | | 392/452 |

(Continued)

FOREIGN PATENT DOCUMENTS

EP 1746362 A2 1/2007

*Primary Examiner* — Thor S Campbell
(74) *Attorney, Agent, or Firm* — Michael Best & Friedrich LLP (57) ABSTRACT

A water heater includes a water tank for storing water to be heated and a thermosiphon tube in the water tank. The thermosiphon tube has a first end in a bottom portion of the water tank and a second end in a top portion of the water tank. At least a portion of a condenser tube of a heat pump is surrounded by the thermosiphon tube to define a water flow channel between the thermosiphon tube and the condenser tube. The condenser tube is at an elevated temperature compared to water temperature in the water flow channel due to a refrigerant cycle of the heat pump. A water pump is configured to flow water through the water flow channel to heat the water in the water flow channel and deliver the heated water into the top portion of the water tank through the second end of the thermosiphon tube.

21 Claims, 7 Drawing Sheets

(56) References Cited

U.S. PATENT DOCUMENTS

| | | | |
|---|---|---|---|
| 3,546,429 A * | 12/1970 | Phillips | F24H 1/202 392/452 |
| 4,146,087 A * | 3/1979 | Johansson | F28D 20/0039 126/400 |
| 4,280,556 A | 7/1981 | Cooper | |
| 4,403,137 A * | 9/1983 | Glazer | F24H 1/202 392/448 |
| 4,479,727 A | 10/1984 | Domingorena et al. | |
| 5,014,770 A * | 5/1991 | Palmer | F24D 3/005 165/48.2 |
| 5,052,187 A * | 10/1991 | Robinson, Jr. | F24H 4/04 237/2 B |
| 5,368,786 A | 11/1994 | Dinauer et al. | |
| 5,495,551 A * | 2/1996 | Robinson, Jr. | F24D 19/1054 165/240 |
| 5,878,192 A * | 3/1999 | Jackson | F24H 1/202 126/344 |
| 6,370,328 B1 * | 4/2002 | Mottershead | F24H 1/202 126/639 |
| 7,024,877 B2 | 4/2006 | Yap | |
| 7,055,339 B2 | 6/2006 | Hebert | |
| 7,543,456 B2 | 6/2009 | Sinha et al. | |
| 2004/0069006 A1 * | 4/2004 | Hebert | F24H 4/04 62/434 |
| 2006/0213210 A1 * | 9/2006 | Tomlinson | F24H 4/04 62/238.6 |
| 2011/0041835 A1 | 2/2011 | Blevins | |
| 2011/0252820 A1 * | 10/2011 | Hockman | F24H 4/04 62/238.7 |
| 2012/0060534 A1 * | 3/2012 | Zhang | F24H 1/18 62/238.7 |
| 2014/0363146 A1 * | 12/2014 | Compton | F24H 1/20 392/441 |
| 2015/0300719 A1 | 10/2015 | Strickland et al. | |
| 2015/0300746 A1 | 10/2015 | Takinami et al. | |
| 2016/0109156 A1 | 4/2016 | Yin | |

\* cited by examiner

HEAT PUMP WATER HEATER

BACKGROUND

The present invention relates to a heat pump water heater with an internal condenser, a thermosiphon tube, and a pump.

Tank-type heat pump water heaters (HPWH) with internal condensers are known. In such known HPWH's, the condenser extends through the top of the water tank into the water tank to a coiled section within a bottom portion of the water tank. The condenser then extends back through the top of the water tank. In such internal coiled condenser designs, the condenser extends vertically through the water tank to the coiled section. The condenser transfers heat from refrigerant passing through the condenser as part of a refrigeration cycle. Due to the condenser being located inside the water tank, the storage volume of the water tank is reduced. Due to low water side heat transfer, typically the condenser needs to be very long to achieve higher efficiency, further reducing the storage volume. Longer condensers also require a larger refrigerant charge to operate. Therefore, it is beneficial to have a shorter condenser tube. However, shorter condenser tubes also have reduced heat transfer efficiency. As such, there is a desire to create a heat pump water heater that both has a condenser short in length and has high heat transfer efficiency.

SUMMARY

In one embodiment, the invention provides a water heater comprising: a water tank for storing water to be heated; a thermosiphon tube in the water tank and having a first end in a bottom portion of the water tank and a second end in a top portion of the water tank; a heat pump system including an evaporator, a compressor, an expansion device, and a condenser tube for moving a refrigerant through a refrigerant cycle, at least a portion of the condenser tube being surrounded by the thermosiphon tube to define a water flow channel between the thermosiphon tube and the condenser tube, the water flow channel having a first end at the first end of the thermosiphon tube and a second end at the second end of the thermosiphon tube, the condenser tube being at an elevated temperature compared to water temperature in the water flow channel due to the refrigerant cycle; and a water pump configured to flow water through the water flow channel to heat the water in the water flow channel and deliver the heated water into the top portion of the water tank through the second end of the thermosiphon tube.

The invention also provides a method of heating water, the method comprising: providing a water tank for storing water to be heated, a thermosiphon tube in the water tank having a first end in a bottom portion of the water tank and a second end in a top portion of the water tank, and a condenser tube in the water tank, at least a portion of the condenser tube surrounded by the thermosiphon tube to define a water flow channel between the thermosiphon tube and the condenser tube, the water flow channel having a first end at the first end of the thermosiphon tube and a second end at the second end of the thermosiphon tube; moving a refrigerant through a refrigeration cycle including through the condenser tube, the condenser tube being at an elevated temperature compared to water temperature in the water flow channel due to the refrigeration cycle; flowing water through the water flow channel; heating water within the water flow channel via an exchange of heat from the condenser tube; and delivering the heated water from the water flow channel into the top portion of the water tank through the second end of the thermosiphon tube.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
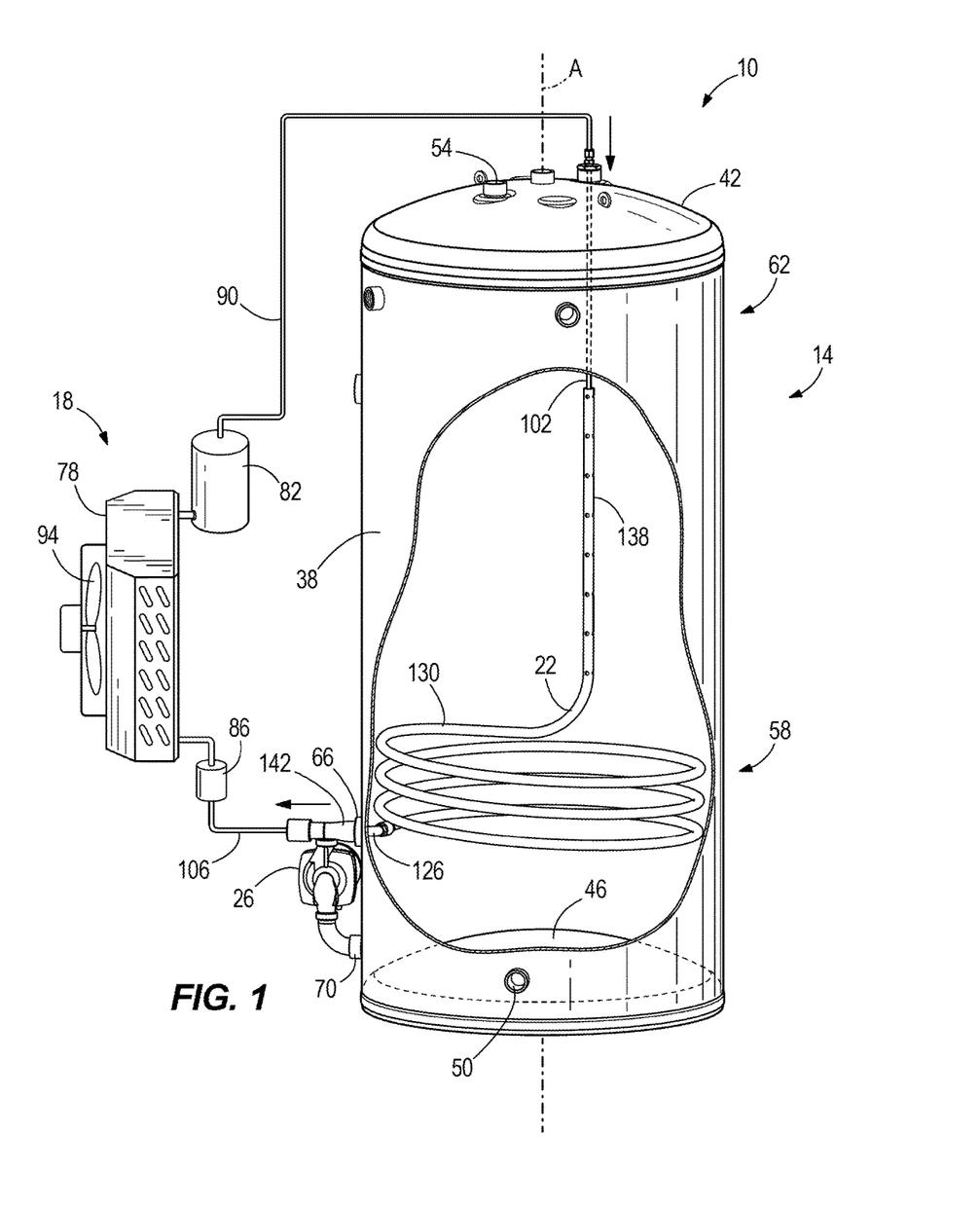
FIG. 1 is a perspective view of a tank-type heat pump water heater (HPWH) including an internal condenser and thermosiphon tube assembly according to the present invention.

FIG. 1 illustrates a first embodiment of a tank-type heat pump water heater (HPWH) 10 according to the present invention. Following is a detailed description of the water heater 10, which is then followed by descriptions of alternative embodiments of the invention. For the sake of brevity, it is to be understood that aspects of each embodiment may be incorporated into the other embodiments, and vice-versa, without specific reference to same in this written description. Indeed, where elements are similar in the various embodiments, the same reference numerals are used in the drawings, despite such elements not always being referenced in the written description for all of the embodiments.

Figure 6:
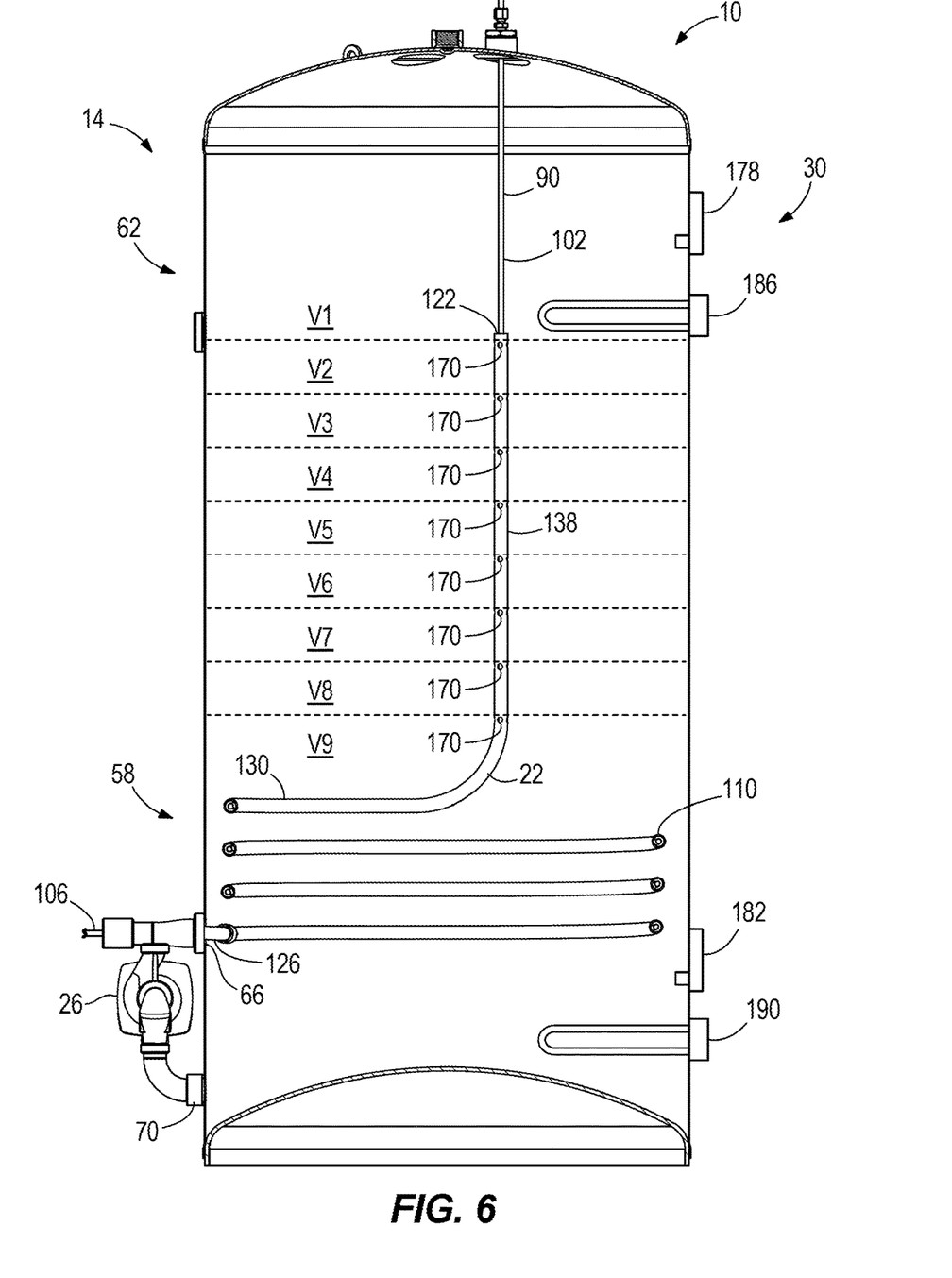
FIG. 6 is a schematic view of the tank-type HPWH of FIG. 1.

With reference to FIG. 1, the water heater 10 includes a water tank 14 for storing water to be heated, a heat pump 18 for heating the water, a thermosiphon tube 22, a water pump 26, and a control system 30 (see FIG. 6). The water tank 14 and all components within the water tank 14 may be enclosed in insulation and a jacket. In the illustrated embodiment, the tank 14 is a vertical tank. In alternate embodiments, the tank 14 may be a horizontal tank or another style of tank.

The tank 14 includes a cylindrical sidewall 38 defining a vertical longitudinal axis A, a top header 42, and a bottom header 46. The tank 14 defines a cold water inlet port 50 and a hot water outlet port 54. A cold water supply pipe (not shown) communicates through the cold water inlet port 50 between the tank 14 and a water utility or other cold water source. The supply of cold water is under pressure and provides positive pressure to the inner space of the tank 14. A hot water supply pipe (not shown) communicates through the hot water outlet port 54 between the tank 14 and a faucet, shower, dishwasher or other plumbing fixture where hot water is put to use. FIG. 1 illustrates the cold water inlet port 50 defined in the sidewall 38 in a bottom portion 58 in a bottom half of the tank 14 and the hot water outlet port 54 defined in the top header 42. In other configurations, the hot water outlet port 54 could be defined in the sidewall 38 in a top portion 62 in a top half of the tank 14. A dip tube may extend from the hot water outlet port 54 into the top portion 62 of the tank 14 to strategically draw hot water from the top portion 62 of the tank 14. In still other configurations, the cold water inlet port 50 may be defined in the top header 42 and a dip tube may extend from the cold water inlet port 50 into the tank 14 to strategically introduce water into the bottom portion 58 of the tank 14.

The tank 14 further defines a thermosiphon inlet port 66 and a pump inlet port 70 in the bottom portion 58 of the tank 14. FIG. 1 illustrates the pump inlet port 70 located below the thermosiphon inlet port 66. The water pump 26 is arranged to flow water out of the bottom portion 58 of the tank 14 via the pump inlet port 70 and to the thermosiphon inlet port 66 during operation of the water pump 26.

The heat pump 18 is illustrated semi-schematically in FIG. 1; not all details of the components are necessarily illustrated. Some components such as motors and power lines are not illustrated for the sake of clarity in the drawing. The main components of the heat pump 18 are an evaporator 78, a compressor 82, an expansion device 86, and a condenser 90. Refrigerant moves through these main components in a refrigerant cycle that absorbs heat from the ambient air around the water heater 10 and transfers the heat to water in the tank 14. A fan 94 moves relatively warm ambient air over the evaporator 78, which may be, for example, a fin-tube heat exchanger with refrigerant inside the tubes. The fan 94 may be driven by an electric motor, for example. The refrigerant is introduced to the evaporator 78 as cool two-phase (liquid mixed with vapor) refrigerant. The relatively warm ambient air warms the cool two-phase refrigerant in the evaporator 78 to convert the liquid portion into vapor refrigerant, such that warm all-vapor refrigerant flows out of the evaporator 78. The ambient air is cooled as a consequence of transferring heat to the refrigerant in the evaporator 78, and moves out of the evaporator 78 under the influence of the fan 94. The cool air can be ducted to a space where cool air is desired.

The warm vapor refrigerant moves from the evaporator 78 to the compressor 82 under the influence of the suction of the compressor 82, and carries the heat it absorbed from the ambient air in the evaporator 78. The compressor 82 may also be driven by an electric motor, for example. The compressor 82 compresses the warm vapor refrigerant, which raises the refrigerant's temperature and pressure to produce superheated vapor refrigerant. The superheated vapor refrigerant moves through the condenser 90 and causes the condenser 90 to become hot. The hot condenser 90 heats water in the tank 14 to produce hot water. As heat is exchanged from the superheated vapor refrigerant to the water through the condenser 90, the superheated refrigerant cools. As the superheated refrigerant cools, liquid droplets form. More and more liquid droplets form as the refrigerant moves along the condenser tube and cools further. Eventually, the refrigerant becomes all liquid with some subcooling at the end of the condenser 90. The subcooled liquid refrigerant flows through the expansion device 86, resulting in the two-phase cool refrigerant mentioned above. The expansion device 86 may be, for example a TXV (thermal expansion valve), EXV (electric expansion valve), capillary tube, or some kind of combination of capillary tube and other devices such as TXV. The two-phase cool refrigerant flows to the evaporator 78 and the cycle repeats.

FIG. 1 illustrates the evaporator 78, the compressor 82, the expansion device 86, and a portion of the condenser 90 schematically and remote from the tank 14. However, in some embodiments, these components of the heat pump 18 may be supported above or on top of the top header 42 and enclosed by a housing also supported by the top header 42. The housing may include vent openings to allow for air to be drawn in the housing and through the evaporator 78 by the fan 94. In this regard, the water heater 10 may be configured such that the heat pump fits within the footprint of the water tank, which may be helpful when replacing an existing water heater with one according to the present invention and available space is limited to the footprint of the existing water heater. In other embodiments, the heat pump 18 may be supported on the sidewall 38 of the tank 14 and enclosed in a housing attached to the sidewall 38 of the tank 14.

Figure 8:
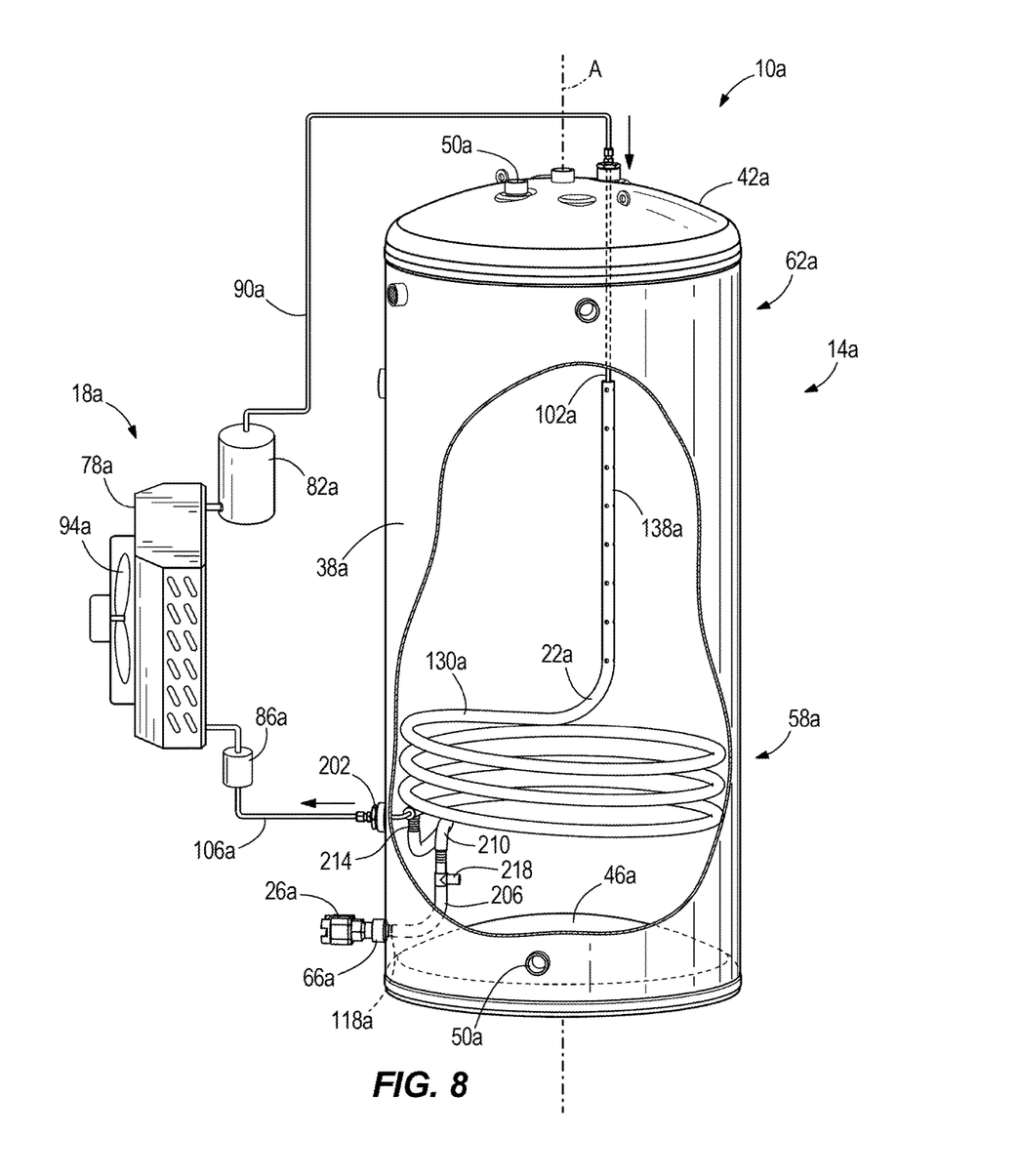
FIG. 8 is a perspective view of a tank-type HPWH including an internal condenser and thermosiphon tube assembly according to another embodiment of the present invention.

At least a portion of the condenser 90 is submerged within the water in the tank 14. Depending on the regulations of the territory in which the water heater 10 is used, the condenser 90 may have a double-walled configuration. The condenser 90 includes a vertical inlet section 102, an outlet section 106, and a coil section 110 (FIG. 2) communicating between the inlet and outlet sections 102, 110. The vertical inlet section 102 passes through the top header 42 and the top portion 62 of the tank 14 to the coil section 110 positioned in the bottom portion 58 of the tank 14. In other constructions, the inlet section 102 may extend through the sidewall 38 of the top portion 62 of the tank 14 (e.g., the inlet section 102 may extend horizontally into the top portion 62 of the tank 14 through the sidewall 38, then make a right angle bend and extend vertically downward to the coil section 110; alternatively, the inlet section 102 may extend into the bottom portion 58 of tank 14 through either the sidewall 38 or the bottom header 46, extend up into the top portion 62 before extending down again). FIG. 1 illustrates the outlet section 106 extending out of the tank 14 through the thermosiphon inlet port 66. In other embodiments, the outlet section 106 may extend out through a separate port in the sidewall 38 of the tank 14, as shown in the embodiment of FIG. 8. The outlet section 106 also includes an external portion extending outside of the tank 14. In some embodiments, the external portion of the outlet section 106 extends alongside the tank 14 toward the top header 42 and is enclosed within the outer casing. The inlet section 102 of the condenser 90 receives the superheated vapor refrigerant from the compressor 82 and the outlet section 106 of the condenser 90 delivers the subcooled liquid refrigerant to the expansion device 86. Most of the heat exchange between the refrigerant and the water occurs along the coil section 110, which is the longest section within the tank 14.

Natural convection (i.e., natural tank water temperature stratification) causes warmer water in the tank 14 to rise to the top portion 62 of the tank 14 and cooler water to sink to the bottom portion 58 of the tank 14. Accordingly, the water in the tank 14 has a temperature gradient in which water in the top portion 62 is hottest and temperature of water decreases along the longitudinal axis A of the tank 14 to a bottom of the bottom portion 58 where water is coldest in the tank 14. This is especially the case after a hot water performance draw where cold water is introduced into the bottom portion 58 of the tank 14 and hot water is removed from the top portion 62 of the tank 14. The inlet section 102 extends vertically through the hottest water in the tank 14, in the top portion 62 of the tank 14. Because it is undesirable to add heat (via the hot inlet section 102 of the condenser) to the hot water in the top portion 62 of the tank 14, the total heat transfer surface area of the inlet section 102 exposed to water in the top portion 62 of the tank 14 is minimized by the straight, vertical run. The outlet section 106 extends out the bottom portion 58 of the tank 14 (i.e., through the coolest water in the tank 14) to reduce or minimize the draw of heat (via the cool outlet section 106 of the condenser 90) from the water in the tank 14.

Figure 2:
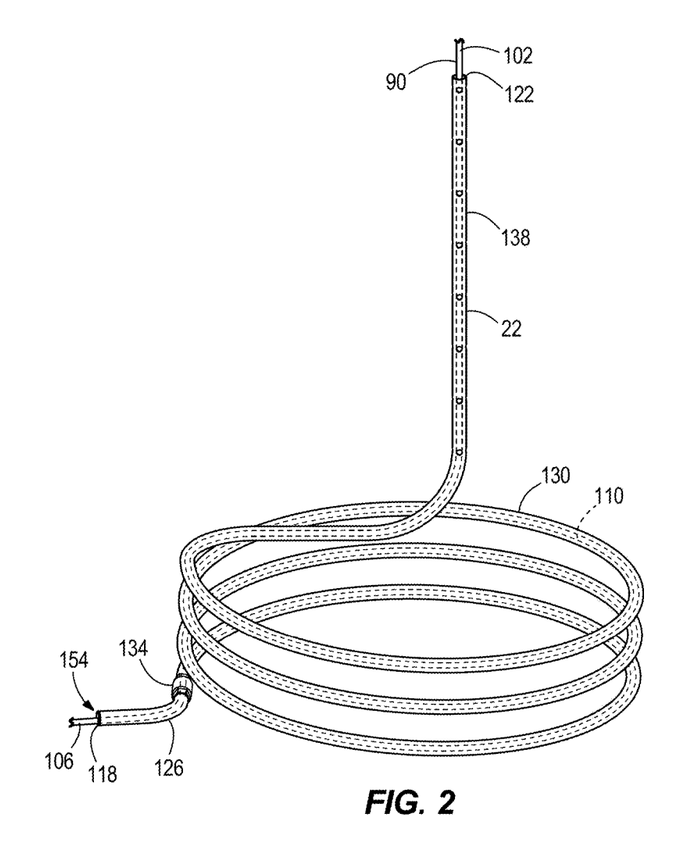
FIG. 2 is a perspective view of the condenser and thermosiphon tube assembly of FIG. 1.

With reference to FIGS. 1-2, the thermosiphon tube 22 is positioned within the tank 14 and surrounds at least a portion of the condenser 90 within the tank 14. In this regard, the tank 14 can be said to include a condenser and thermosiphon tube assembly, which is a heat exchanger assembly. The thermosiphon tube 22 has a first end 118 in the bottom portion 58 of the tank 14 and a second end 122 in the top portion 62 of the tank 14. The thermosiphon tube 22 follows the shape of the condenser 90, and as such includes a horizontal inlet section 126 extending from the first end 118 and surrounding the outlet section 106 of the condenser 90 within the tank 14. The thermosiphon tube 22 further includes a coil section 130 extending from the horizontal inlet section 126 via a coupling 134 and surrounding the coil section 110 of the condenser 90. The thermosiphon tube 22 further includes a vertical outlet section 138 extending from the coil section 130 of the thermosiphon tube 22 to the second end 122 and partially surrounding the vertical section 102 of the condenser 90. In the illustrated embodiment, the second end 122 of the thermosiphon tube 22 is spaced from the top header 42, but may abut or be connected to the top header 42 in other embodiments. The vertical outlet section 138 extends from the coil section 130 such that the vertical section 130 covers a majority of the height of the tank 14 from the coil section 130 toward the top header 42. This allows for improved hot water delivery and maintains a low inlet water temperature of the water pump for longer during operation of the heat pump 18 to improve efficiency. As shown in FIG. 1, a fitting 142 connects the first end 118 of the thermosiphon tube 22 to the tank 14 at the thermosiphon inlet port 66. In some embodiments, the thermosiphon tube 22 and the condenser 90 are self-supported due to their inherent rigidity. In other embodiments, a frame or rack may be provided within the tank 14 to support the thermosiphon tube 22 and the condenser 90 on the bottom header 46 of the tank 14, and to maintain proper spacing between each of the coils of the coil sections 130, 110 of the thermosiphon tube 22 and the condenser 90. The rack may be made of plastic or another material suitable for perpetual submersion in hot water.

Figure 3:
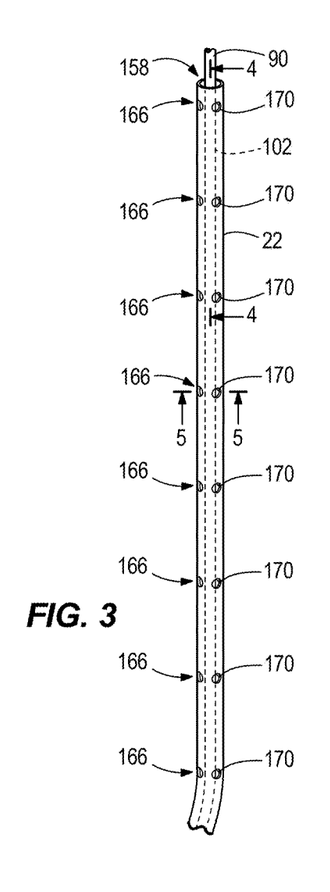
FIG. 3 is an enlarged perspective view of a vertical portion of the condenser and thermosiphon tube assembly.
Figures 4, 5:
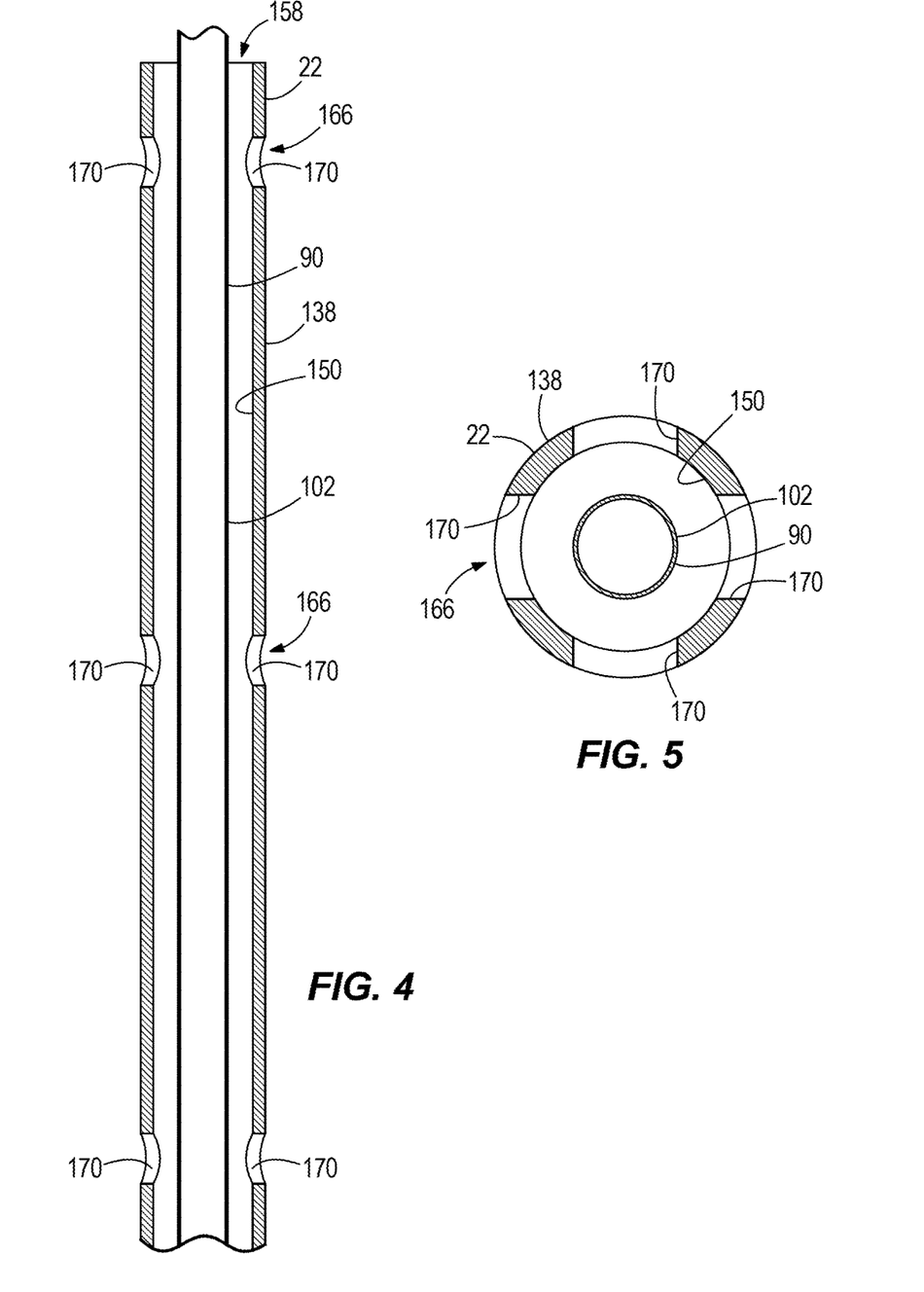
FIG. 4 is a cross-section of the condenser and thermosiphon tube assembly taken along line 4-4 in FIG. 3.
FIG. 5 is a cross-section of the condenser and thermosiphon tube assembly taken along line 5-5 in FIG. 3.

As best shown in FIGS. 3-5, the condenser 90 extends concentrically through the thermosiphon tube 22 along the length of the thermosiphon tube 22. An annular water flow channel 150 (see FIGS. 4-5) is defined between the condenser 90 and the thermosiphon tube 22. The annular water flow channel 150 has a first open end 154 (see FIG. 2) at the first end 118 of the thermosiphon tube 22 and a second open end 158 (see FIG. 3) at the second end 122 of the thermosiphon tube 22. Suitable materials for the condenser 90 include coated steel, stainless steel, copper, coated aluminum, and high conductivity plastic or polymer materials. Suitable materials for the thermosiphon tube 22 include plastic, polymer, coated steel, stainless steel, coated aluminum, or copper. The thermosiphon tube 22 and the condenser 90 may be made by extrusion or another suitable method. Pressure within the thermosiphon tube 22 is substantially the same as pressure within the tank 14, both during operation of the pump 26 and during standby. As such, the thermosiphon tube 22 does not necessarily need to withstand high water pressure. Accordingly, the thermosiphon tube 22 may be made of a thinner material (e.g., thin-walled plastic). Because the thermosiphon tube 22 is submerged within and in fluid communication with the tank 14, the pressure within the tank 14 and the thermosiphon tube 22 are the same when the pump 26 is inoperative. While the pump 26 is operative, the pressure within the thermosiphon tube 22 is increased, but the pressure change is minimal relative to the overall pressure within the tank 14. Accordingly, the pressure within the thermosiphon tube 22 and the tank 14 can be said to be substantially the same even when the pump 26 is operative to force water through the thermosiphon tube 22.

In some embodiments, spacers (not shown) may be positioned between the thermosiphon tube 22 and the condenser 90 to maintain consistent spacing between the outer surface of the condenser 90 and the inner surface of the thermosiphon tube 22 along the length of the thermosiphon tube 22. The spacers may be separate from both the thermosiphon tube 22 and the condenser 90, or integrally formed with either the thermosiphon tube 22 and the condenser 90. In some embodiments, the thermosiphon tube 22 may have another cross-sectional shape. The thermosiphon tube 22 may also include internal fins, grooves, dimples, or similar features. In some embodiments, the condenser 90 may be split such that two or more condenser tubes extend through the thermosiphon tube 22 to increase the surface area of the condenser 90. In other embodiments, multiple parallel tubes 90 could be twisted together (e.g., in a helical pattern) to form various cross-sections. The extruded condenser tube 90 could also be provided with a non-circular cross-section. For example, in some constructions, the condenser 90 may include internal fins, grooves, dimples, or similar features to increase the surface area of the condenser 90 to improve heat transfer to the water.

The position and shape of the coil sections 110, 130 can be modified to achieve a desired water heater effect. The coil sections 110, 130 may include a non-constant coil diameter, by which the diameter of the coil sections 110, 130 increases or decreases. The coil diameter may increase or decrease at strategically chosen portions of the tank 14, may increase or decrease linearly or as a function of the longitudinal position (i.e., position along the longitudinal axis A) within the tank 14, or may be hourglass shaped just to name a few potential configurations and shapes. In the illustrated embodiment, the coil sections 110, 130 are located in the bottom portion 58 of the tank 14. In other embodiments, the coil sections 110, 130 may be positioned anywhere along the axis A (e.g., in the top portion 62 of the tank 14, or partially in both the top portion 62 and the bottom portion 58 of the tank 14). In some embodiments, the location of the coil sections 110, 130 may be optimized based on where the condenser 90 enters into and exits from the tank 14.

As best shown in FIGS. 3-4, the vertical outlet section 138 of the thermosiphon tube 22 defines a plurality of openings 170. The openings 170 are spaced evenly along the longitudinal axis A in eight sets 166. Each of the sets 166 has four openings 170 (see FIG. 5) evenly spaced circumferentially about the thermosiphon tube 22. In some embodiments, there may be more or fewer than eight sets 166 and/or more or fewer than four openings 170 in each set 166. In some embodiments, the number of sets 166 of openings 170 and the number of openings 170 in each set 166 may be dependent on the flow rate of the pump 26. In some embodiments, the number of sets 166 of openings and the number of openings 170 as well as their relative positions along the thermosiphon tube 22 may be determined based on the total tank volume and/or tank diameter. With reference to FIG. 6, the water within the tank 14 includes a first volume V1 between the top header 42 and the second end 122 of the thermosiphon tube 22. The tank 14 further includes second through eighth volumes V2, V3, . . . V8 defined axially between adjacent sets 166 of openings 170 along the longitudinal axis A from top to bottom. A ninth volume V9 is defined axially below the lowest set of openings 170 in the bottom portion 58 of the tank 14. Each of the volumes V1-V9 has an average temperature. The average temperature is highest within the first volume V1 and decreases in each volume along the longitudinal axis A to the ninth volume V9, due to natural tank water temperature stratification and water draws, as described above.

With reference back to FIG. 1, the superheated vapor refrigerant enters the circular cross-section condenser inlet section 102. The superheated vapor refrigerant moves through the inlet section 102 and enters the top of the coil section 110. The superheated vapor refrigerant moves downward through the condenser coil section 110, giving up heat to the water in the water flow channel 150 along the way and toward the bottom of the coil section 110 becoming subcooled liquid refrigerant. From the bottom of the coil section 110, the subcooled liquid refrigerant enters the outlet section 106 and moves outside the tank 14 to the expansion device 86. The superheated vapor refrigerant is introduced at the top of the coil section 110 rather than the bottom to follow the temperature gradient of the water in the water flow channel 150 and the tank 14. The hottest refrigerant transfers heat to the warm water in the water flow channel 150 within the vertical section 138 of the thermosiphon tube 22 and the cooler refrigerant lower in the coil section 130 of the thermosiphon tube 22 transfers heat to progressively cooler water in the water channel 150.

With reference to FIG. 1, the fitting 142 fluidly communicates the first open end 154 of the water flow channel 150 with the thermosiphon inlet port 66.

During operation of the water pump 26, the water pump 26 generates forced water flow from the bottom portion 58 of the tank 14 via the pump inlet port 70 to the thermosiphon inlet port 66. The water flows through the fitting 142 and into the water flow channel 150 within the thermosiphon tube 22. The water flows through the water flow channel 150 within the coil section 130 of the thermosiphon tube 22, as heat is transferred to the water by the coil section 110 of the condenser 90. The water within the water flow channel 150 leaves the coil section 130 of the thermosiphon tube 22 at a raised temperature and enters the vertical outlet section 138 of the thermosiphon tube 22. With reference to FIG. 6, the heated water enters the vertical outlet section 138, flows along the vertical outlet section 138, and is distributed to the tank 14 to one of the volumes V1-V9 having a temperature corresponding (i.e., approximately equal) to the heated water via either the second open end 158 or a corresponding one of the sets 166 of the openings 170. The water flows through the water flow channel 150 in the opposite direction to the refrigerant within the condenser 90, thus acting like a counter-flow heat exchanger.

More specifically, if the temperature of the heated water in the water flow channel 150 after leaving the coil section 130 is equal to or greater than the temperature of water within the first volume V1, the heated water flows upwardly within the vertical outlet section 138 and exits the flow channel 150 at the second open end 158 into the first volume V1. If the temperature of the heated water is less than the temperature of water within the first volume V1 but greater than or equal to the temperature of water within the second volume V2, at least some of the heated water is delivered directly to the second volume V2 via the set 166 of openings 170 positioned axially within the second volume V2 (i.e., the uppermost set 166 of openings 170). At least some of the heated water is delivered to the third volume V3 via the set of openings 170 positioned within the third volume V3, if the temperature of the heated water is less than the temperature of water within the second volume V2 but greater than or equal to the temperature of water within the third volume V3 (i.e., greater than the temperature within the fourth volume V4). Heated water may be similarly delivered to each of the volumes V4-V9 via a corresponding one of the sets 166 of openings 170 (i.e., at least some of the heated water is delivered to one of the volumes V4-V9, if the heated water has a temperature less than the temperature of the volume directly above the one of the volumes V4-V9, but greater than the volume directly below the one of the volumes V4-V9). The thermosiphon tube 22 acts as a guide for water to flow to the top portion 62 under the influence of the water pump 26 in close proximity with the condensing tube without quickly losing heat to surrounding water within the tank 14. Due to each of the sets of openings 170 being spaced along the axis A, at least some of the water may then exit the thermosiphon tube 22 at a corresponding set 166 of openings 170 based on the temperature distribution in the tank 14, such that lower temperature water is delivered lower in the tank 14 while hotter water is delivered higher in the tank 14. The thermosiphon tube 22 allows water to be heated efficiently within the water flow channel 150 and directly delivered to a volume having a corresponding temperature, such that hot water can be delivered to the top portion 62 of the tank 14 without needing to heat large amounts of cold water within the bottom portion 58 of the tank 14. In some embodiments, there may only be an opening in the second open end 158 without the openings 170 along the length of the vertical outlet section 138 of the thermosiphon tube 22. The openings 170 positioned closer to the coil section 130 (e.g., the opening in the ninth volume V9 directly adjacent the coil section 130) allow cold water to escape in a lower cold water volume of the tank 14 and inhibit the cold water from being delivered to the top portion 62 of the tank 14 while the water is cold in the bottom portion 62 of the tank 14, thus impeding cold water from mixing with warm water within the top portion 62, which lowers the overall recovery efficiency of the heat pump water heater 10. In some embodiments, there may be a first set 166 of openings 170 adjacent the coil section 130 and an opening at the second open end 158 (or alternatively a second set 166 of openings 170 along the vertical outlet section 138 closer to the second end 158) to allow cold water to escape through the first set 166 of openings 170 adjacent the coil section 130 while guiding hot water out the second open end 158. In some embodiments, the second open end 158 may be positioned immediately after the coil section 130 without the vertical outlet section 138 or the openings 170.

Under normal operation, the water pump 26 is operational in unison with the heat pump 18 such that water is pumped through the water flow channel 150 and simultaneously heated by the condenser 90 before being delivered to the respective volume within the top portion 62 of the tank 14.

As best illustrated in FIG. 6, the control system 30 includes a controller (not shown) monitoring the water temperature within the tank 14. The control system 30 further includes a top temperature sensor 178 monitoring a temperature of the water in the top portion 62 of the tank 14, and a bottom temperature sensor 182 monitoring a temperature of the water in the bottom portion 58 of the tank 14. Each of the top and bottom temperature sensors 178, 182 generates signals related to the temperature of water in the top and bottom portions of the tank 14, respectively. The controller also communicates with the heat pump 18 and the water pump 26 to control operation of each based on the measured temperatures from the temperature sensors 178, 182 compared to a set temperature, as described in more detail below. The controller also communicates with a top electric heating element 186 extending into a top portion 62 of the tank 14 and a bottom electric heating element 190 extending a bottom portion 58 of the tank 14 to turn on the heating elements 186, 190 to provide additional heat transfer to water in the tank 14 as necessary for quick recovery or low ambient operations. The controller turns on the top and bottom electric heating elements 186, 190 based on the measured temperatures from the temperature sensors 178, 182 compared to a set temperature, as described in more detail below. In some embodiments, there may be more or fewer electrical heating elements (e.g., only the top electric heating element 186 may extend into the top portion 62 of the water tank 14). In some embodiments, there may be more or fewer temperature sensors monitoring various volumes of water within the tank 14.

In some embodiments, the controller may control the water pump 26 to vary the flow rate of water through the water flow channel 150 and into the top portion 62 of the tank 14. Alternatively, the controller may control a flow control valve that variably restricts flow through the water flow channel 150 (i.e., if the water pump 26 has a fixed flow when activated), thereby decreasing or increasing the flow of water through the water flow channel 150 and into the top portion 62 of the tank 14. Accordingly, the flow rate of water through the water flow channel 150 may be controlled to provide higher efficiency recovery at an increased (i.e., higher) water flow rate, or a quicker hot water delivery at a decreased (i.e., lower) water flow rate. For lower water flow rates, water can be heated to a higher temperature along the water flow channel 150 due to increased dwell time of water within the water flow channel 150 and higher compressor discharge pressure. Accordingly, hotter water can be delivered to the top portion 62 of the tank 14 faster.

The water heater may be in either a standby mode (which includes initial start-up, when the entire system is originally filled with cold water) or a performance draw mode. During a performance draw, hot water is drawn out of the tank 14 via the hot water outlet port 54 and is delivered to a fixture (e.g., a faucet). When the fixture is opened, pressure from the cold water supply pushes cold water into the bottom portion 58 of the tank 14 through the cold water inlet port 50 from the cold water source to displace hot water from the top portion 62 of the tank 14. As the performance draw continues, more cold water enters the bottom portion 58 of the tank 14, and the water temperature in the tank 14 decreases. During standby operation, hot water is not drawn out of the hot water outlet port 54. While the heat pump 18 is not on, the water in the tank 14 slowly drops in temperature due to heat loss.

During both standby operation and a performance draw, a call for heat is generated by the controller in response to sensing a drop in water temperature in the tank 14. Generally, in response to the call for heat, the water heater 10 is switched on by the controller from a non-heating mode, in which the heat pump 18 and the water pump 26 are deactivated, to a heating mode, in which the heat pump 18 and the water pump 26 are simultaneously activated by the controller. Once the water in the tank 14 has been raised above a predetermined first temperature limit $T_{SET}$ (e.g., 125 degrees Fahrenheit), the controller switches the water heater 10 back into the non-heating mode.

Figure 7:
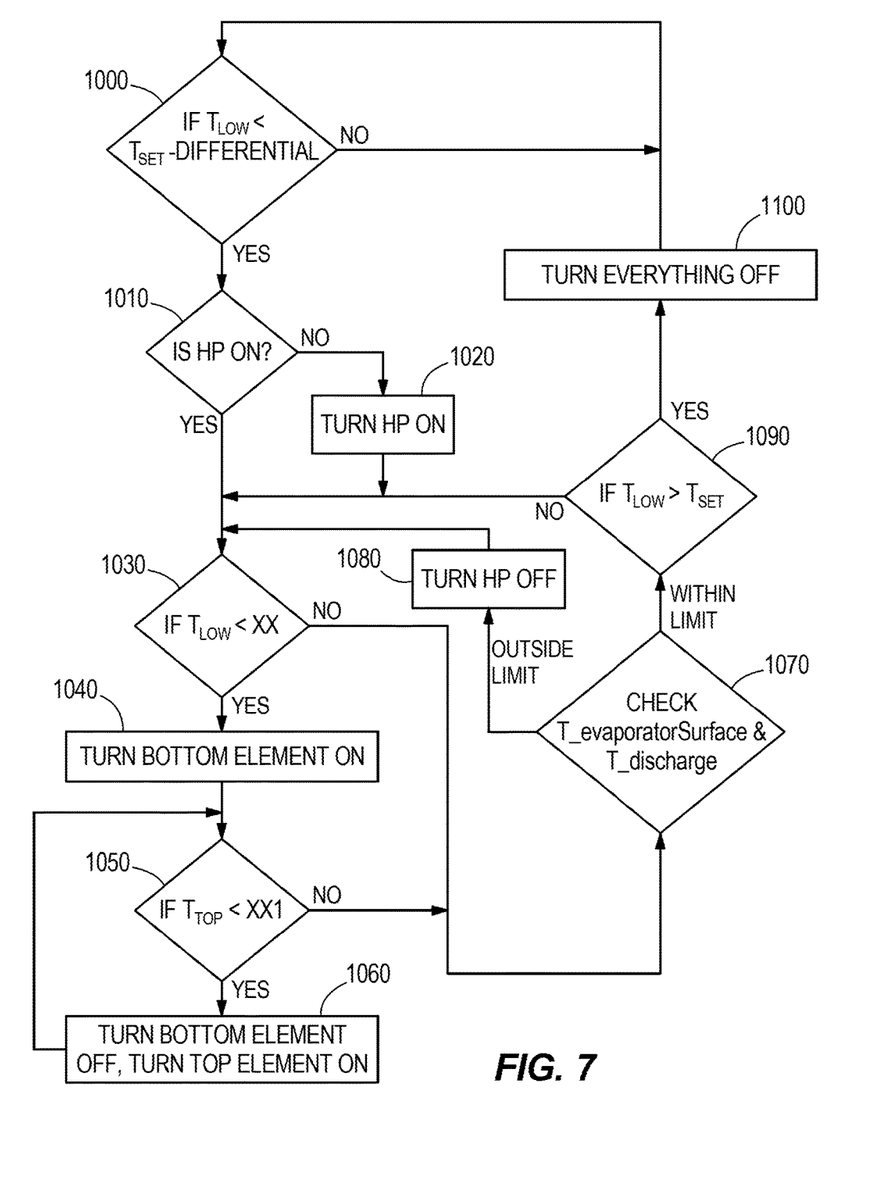
FIG. 7 is a flowchart illustrating control logic for the tank-type HPWH of FIG. 1.

With reference to FIG. 7, more specifically, at box 1000 the controller's logic continuously monitors a temperature $T_{TOP}$ of the water in the top portion 62 of the tank 14 with the top temperature sensor 178 and a temperature $T_{LOW}$ of the water in the bottom portion 58 of the tank 14 with the bottom temperature sensor 182. If the bottom temperature sensor 182 detects that the temperature $T_{Low}$ of the water in the bottom portion 58 has dropped below a second temperature limit, which is less than the first temperature limit $T_{SET}$ by a selected differential (e.g., 10 degrees Fahrenheit), the controller will check at box 1010 whether the heat pump 18 is activated. If the heat pump 18 is not activated, the controller will go to box 1020 and generate a call for heat and activate the heat pump 18. The controller may also simultaneously activate the water pump 26 at box 1020. Alternatively, the water pump 26 may be tied to activation of the heat pump 18, such that when the heat pump 18 is activated the water pump 26 follows, or vice versa. In some embodiments, the call for heat may be generated if the temperature $T_{TOP}$ of water within the top portion 62 being monitored by the top temperature sensor 178 drops below a predetermined temperature limit. In further embodiments, the call for heat may be generated based on a combination of the monitored temperatures $T_{TOP}$, $T_{LOW}$ of the top and bottom temperature sensors 178, 182, or one or more other temperature sensors.

After activating the heat pump 18 or if the heat pump 18 is already activated, the control logic moves to box 1030 where it compares the temperature $T_{LOW}$ of water in the bottom portion 58 of the tank 14 with a third temperature limit XX. If the temperature $T_{LOW}$ of water in the bottom portion 58 of the tank 14 is below the third temperature limit XX, the control logic moves to box 1040 where it activates the bottom electric heating element 190 and then to box 1050 where it compares the temperature $T_{TOP}$ of water in the top portion 62 of the tank 14 with a fourth temperature limit XX1. If the temperature $T_{TOP}$ of water in the top portion 62 of the tank 14 is below the fourth temperature limit XX1, the control logic moves to box 1060 where it deactivates the bottom electric heating element 190 and activates the top electric heating element 186. Typically, the third and fourth temperature limits XX, XX1 are less than the second temperature limit, so that the electric heating elements 186, 190 are only activated when the temperature of water within the tank 14 has significantly decreased (e.g., due to running a long performance draw until the hot water is significantly depleted).

If either of the temperatures $T_{LOW}$, $T_{TOP}$ within the bottom and top portions 58, 62 of the tank 14 is above their respective third and fourth temperature limits XX, XX1, the controller then moves to box 1070 and performs a check on the evaporator surface temperature T_evaporatorSurface and the discharge temperature T_discharge of the compressor 82 at box 1070. If one or both of the evaporator surface temperature T_evaporatorSurface and the discharge temperature T_discharge are outside of respective predetermined limits (e.g., if the evaporator surface temperature is lower than 32 degrees Fahrenheit, this control logic is for heat pumps without an automatic de-frost system; however, the control logic may include additional logic to accommodate a heat pump with an automatic de-frost system), the control logic moves to box 1080 where the heat pump 18 is deactivated and the control logic returns to box 1030 for monitoring the temperature $T_{LOW}$ of water within the bottom portion 58 of the tank 14 against the third temperature limit XX. However, if both of the evaporator surface temperature T_evaporatorSurface and the discharge temperature T_discharge are within the respective predetermined limits, the control logic moves to box 1090 where it checks whether the temperature $T_{LOW}$ of water within the bottom portion 58 now exceeds the first temperature limit $T_{SET}$. If so, the control logic moves to box 1100 where an end to the call for heat occurs and the controller deactivates all currently activated components (e.g., the heat pump 18, the water pump 26, the top electric heating element 186, and/or the bottom electric heating element 190) and returns to monitoring the temperatures $T_{TOP}$, $T_{LOW}$ of the top and bottom portions 62, 58 of the tank 14 via the temperature sensors 178, 182. Otherwise, the controller returns to box 1030 and compares the temperature $T_{LOW}$ of water within the bottom portion 58 of the tank 14 with the third temperature limit XX. In some embodiments, the controller may use the rate of change of various control parameters to control activation of the heat pump 18 or heating elements 178, 182 (e.g., the controller may control activation of the bottom heating element 190 based on the rate of change of the temperature $T_{LOW}$ measured in the bottom portion 58 of the tank 14 by the bottom temperature sensor 182). In some embodiments, the heat pump 18 may include smart controls, such that during periods of time in which the user does not have a large hot water demand, the heat pump 18 may operate at a reduced input to have a longer but more energy efficient recovery.

Figure 9:
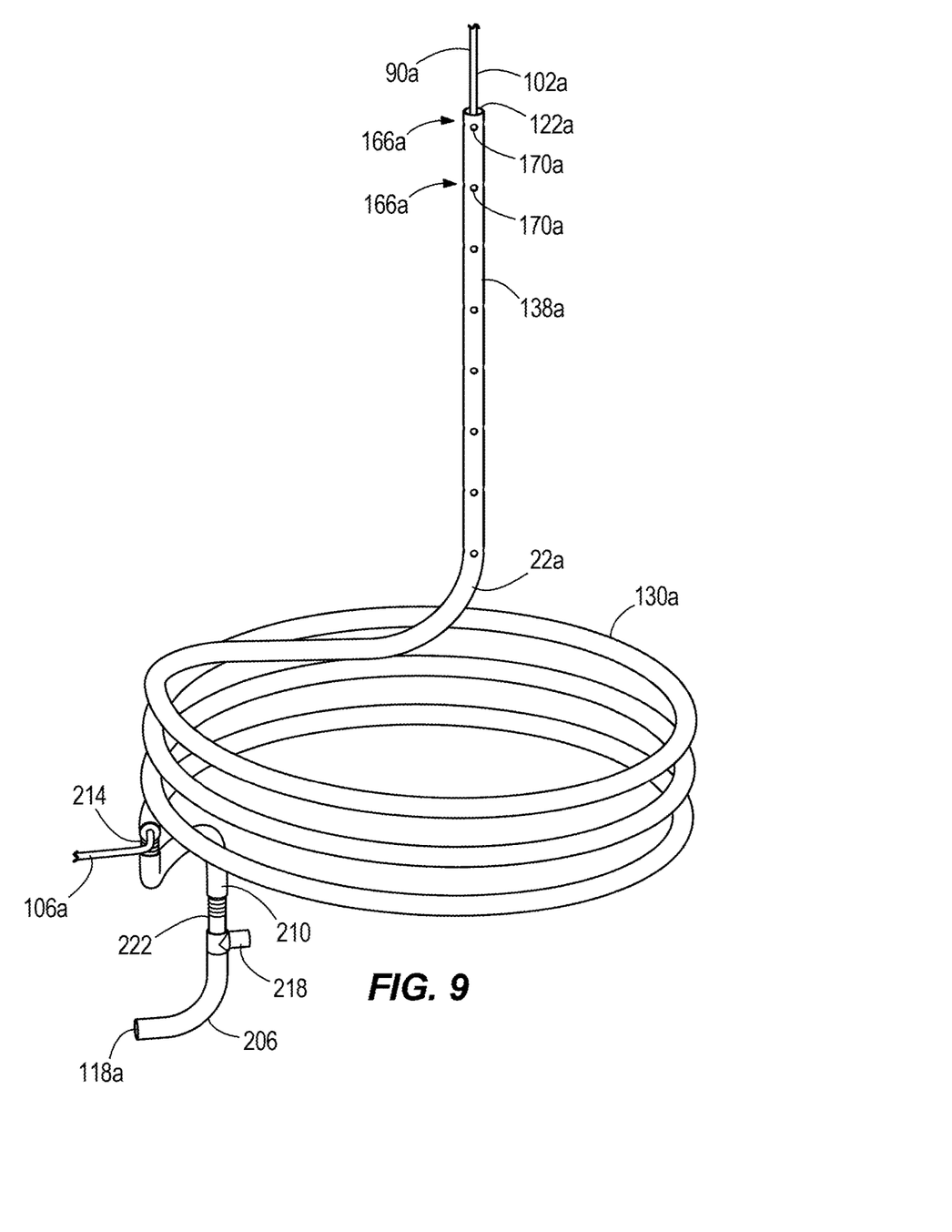
FIG. 9 is a perspective view of the condenser and thermosiphon tube assembly of FIG. 8.

FIGS. 8-9 illustrate a second embodiment of a tank-type heat pump water heater 10a according to the present invention. The water heater 10a is substantially similar in construction and operation to the water heater 10 shown in FIGS. 1-6. Accordingly, similar features are identified with like reference numerals plus "a" and only differences in construction and operation are described in detail below.

The water pump 26a is mounted through a spud 66a on the tank 14a such that a shaft of a propeller (not shown) of the pump 26a extends into the bottom portion 58a of the tank 14a such that the propeller is located within the first end 118a of the thermosiphon tube 22a. The motor of the pump 26a, which rotates the propeller via the shaft, is located outside the tank 14a. The first end 118a of the thermosiphon tube 22a is positioned inside and in fluid communication with the bottom portion 58a of the tank 14a. The propeller of the pump 26a draws water from the bottom portion 58a of the tank 14a directly into the water flow channel 150a via the first end 118a of the thermosiphon tube 22a without first needing to draw the cold water outside the tank 14a.

In the embodiment of the water heater 10a of FIGS. 8-9, the outlet section 106a of the condenser 90a exits the water heater 10a through the sidewall 38a of the tank 14a above the spud 66a (as opposed to through the thermosiphon inlet port 66, as shown in the embodiment of FIGS. 1-6). A compression fitting 202 is provided where the outlet section 106a of the condenser 90a exits the sidewall 38a of the tank 14a to inhibit leaking at this connection. The thermosiphon tube 22a further includes first and second inlet sections 206, 210 (in lieu of the horizontal inlet section 126 of FIGS. 1-2) extending from the first end 118a of the thermosiphon tube 22a to the coil section 130a, and fluidly communicated via a first coupling 214. The condenser 90a does not extend through the first and second inlet sections 206, 210 or the first end 118a of the thermosiphon tube 22a. The condenser 90a exits the coil section 130a of the thermosiphon tube 22a adjacent the first coupling 214 (i.e., inlet of the coil section 130a). This allows the propeller of the pump 26a to be positioned within the first inlet section 206. The thermosiphon tube 22a is sealed around where the condenser 90a exits to inhibit leaking from the water flow channel 150a into the bottom portion 58 of the tank 14a.

The thermosiphon tube 22a of the water heater 10a of FIGS. 8-9 further includes a check valve 218 positioned within the bottom portion 58a of the tank 14a. The check valve 218 is provided in a second coupling 222 connecting and fluidly communicating the first and second inlet sections 206, 210 of the thermosiphon tube 22a. The check valve 218 is a normally open valve such that when the water pump 26a is off the check valve 218 is in an open position to communicate the water flow channel 150a with water in the bottom portion 58a of the tank 14a. Under normal operation, when the water pump 26a is on, the pressure difference between water being pumped through the water flow channel 150a and water within the tank 14a causes the check valve 218 to move to a closed position preventing water from exiting the check valve 218 before flowing through the water flow channel 150a. In the open position, the check valve 218 allows water to flow from the bottom portion 58a of the tank 14a through the water flow channel 150 during operation of the heat pump 18a even when the water pump 26a is inoperative due to natural heat convection of water being heated within the water flow channel 150a. More specifically, water within the water flow channel 150a rises in temperature due to heat from the condenser 90a, causing the water within the water flow channel 150a to begin flowing upward through the water flow channel 150a toward the second open end 158a due to buoyancy caused by natural convection. The heated water exits the vertical outlet section 138a of the thermosiphon tube 22a to the corresponding volumes, as described above. As the heated water rises and exits the thermosiphon tube 22a, relatively colder water is drawn into the thermosiphon tube 22a via the check valve 218 due to natural convection. Accordingly, the thermosiphon tube 22a performs hot water recovery even when the water pump 26a is inoperative. Although when the water pump 26a is operative, the recovery has a higher efficiency.

In the illustrated embodiment of FIGS. 8-9, the check valve 218 is closer to the first end 118a of the thermosiphon tube 22a within the bottom portion 58a of the tank 14a prior to the coil section 130a of the thermosiphon tube 22a so that water flows through a majority of the water flow channel 150a under natural convection. In some embodiments, the check valve 218 may be positioned anywhere along the length of the thermosiphon tube 22a.

Heat pump water heaters according to the present invention may include improved heating efficiency over known tank-type heat pump water heaters. The present invention positions the condenser of a tank-type heat pump water heater inside the tank 14, surrounds the condenser 90 with the thermosiphon tube 22, and pumps water to the top portion 62 of the tank 14 along the condenser 90. With the coil section 110 of the condenser 90 within the coil section 130 of the thermosiphon tube 22 inside the tank 14, the water does not have to be heated through the tank wall 38. The coil section 110 of the condenser 90 can be fully submerged in the water within the water flow channel 150 within the tank 14, which inherently can fully utilize the heat transfer surface between the coil section 110 of the condenser 90 and the water within the water flow channel 150 to be heated, compared to an external condenser which necessarily has a portion of its potential heat transfer surface area facing away from the tank 14. Also, because the coil section 110 of the condenser 90 is inside the tank 14, the space between the jacket and the tank 14 that would have been occupied by the condenser 90 (for external condenser designs) can be occupied by additional foam insulation to reduce standby heat loss.

HPWHs often are designed with the condenser on the outside of the water tank to avoid lowering the storage volume of the tank. For traditional HPWHs with an external condenser tube wrap design, the water side within the tank only flows under natural convection, which has a low heat transfer coefficient, such that the water side is the limiting factor to achieve higher efficiency. As such, the only way to improve the efficiency in such HPWHs is to increase the condenser tube length to increase the heat transfer surface area, but this is limited by the total tank outer surface area, which is also not very effective at transferring heat along the top portion 62 of the tank 14. The present invention, however, improves the heat transfer efficiency from the condenser 90 by providing forced water flow through the water flow channel 150 along the condenser 90 generated by the pump 26, such that the condenser 90 can be made significantly shorter and reduce the volume of water displaced by the condenser 90. The heat transfer efficiency is improved by the present invention by providing the thermosiphon tube 22 so as to surround the condenser 90 for delivering heated water from the bottom portion 58 of the tank 14 (or the cold water supply) to the top portion 62. The thermosiphon tube 22 allows water to be flowed along the condenser 90, while the condenser 90 heats the water, before ultimately being delivered to the hot water volume within the top portion 62 of the tank 14. This reduces the need for heating a large volume of water in the bottom portion 58 before water in the top portion 62 is raised in temperature significantly. This also allows the heat pump 18 to operate efficiently regardless of how much hot water is within the tank 14 (e.g., if the tank 14 is full of cold water after a hot water performance draw, or if the top portion 62 of the tank 14 still contains hot water). Accordingly, the condenser 90 can have a very short tube length (as compared to external tube wrapping, or an internal tube coil without a thermosiphon tube). This reduces the refrigerant charge amount (e.g., from approximately 750 g to approximately 250 g). This also reduces the average discharge pressure of the compressor 82 during operation of the heat pump 18, which increases the life of the compressor 82.

This condenser and thermosiphon tube assembly design allows the heat pump 18 to operate at higher efficiency for longer during recovery compared to prior designs. This design could also cut the condenser tube length and use lower cost materials compared to prior internal and external condenser designs. Thus, this design could be easier to manufacture, and has potential to be lower cost due to reduced material usage and cost. The present invention can be used for a high performance HPWH with more coil turns; or a lower cost HPWH having fewer coil turns.

Thus, the invention provides, among other things, a HPWH having an internal condenser and a concentric thermosiphon tube surrounding the condenser to promote heat transfer and delivery of heated water to the proper hot water volume within the water storage tank. Various features and advantages of the invention are set forth in the following claims.

What is claimed is:

1. A water heater comprising:
   a water tank for storing water to be heated, the water tank including a thermosiphon inlet port and a pump inlet port;
   a thermosiphon tube in the water tank and having a first end in a bottom portion of the water tank communicating with the thermosiphon inlet port such that all water flowing through the thermosiphon inlet port flows into the thermosiphon tube and a second end in a top portion of the water tank;
   a heat pump system including an evaporator, a compressor, an expansion device, and a condenser tube for moving a refrigerant through a refrigerant cycle, at least a portion of the condenser tube being surrounded by the thermosiphon tube to define a water flow channel between the thermosiphon tube and the condenser tube, the water flow channel having a first end at the first end of the thermosiphon tube and a second end at the second end of the thermosiphon tube, the condenser tube being at an elevated temperature compared to water temperature in the water flow channel due to the refrigerant cycle; and
   a water pump configured to draw water from the water tank through the pump inlet port and generate forced water flow through the thermosiphon inlet port such that the entire forced water flow flows through the water flow channel to heat the water in the water flow channel and deliver the heated water into the top portion of the water tank through the second end of the thermosiphon tube.

2. The water heater of claim 1, wherein the thermosiphon tube defines high and low openings communicating between the water flow channel and the top portion of the water tank, wherein each of the high and low openings communicates the channel with the water tank, the low opening being positioned below the high opening.

3. The water heater of claim 2, wherein the thermosiphon tube defines a intermediate opening communicating between the water flow channel and the top portion of the water tank, the intermediate opening being positioned between the high and low openings.

4. The water heater of claim 1, wherein the water pump communicates between the bottom portion of the water tank and the water flow channel to provide water to the water flow channel when a temperature of water in the water tank drops below a set point.

5. The water heater of claim 4, wherein the water pump flows water outside of the tank before pumping water into the water flow channel.

6. The water heater of claim 1,
   wherein the thermosiphon tube includes a coil section positioned within the bottom portion of the water tank.

7. The water heater of claim 6, wherein the thermosiphon tube includes a straight section extending upward from the coil section to the second end within the top portion of the water tank.

8. The water heater of claim 1, further comprising an electric heating element extending into the water tank.

9. The water heater of claim 1, wherein the refrigerant moves through the condenser tube in an opposite direction to the water flowing through the water flow channel.

10. The water heater of claim 1, wherein the water pump is controllable to vary flow rate of water through the water flow channel.

11. The water heater of claim 1, wherein pressure within the water flow channel and pressure within the tank are substantially equivalent.

12. The water heater of claim 1, wherein the thermosiphon tube is made of a thin-walled plastic material.

13. A method of heating water comprising:
providing a water tank for storing water to be heated, the water tank including a thermosiphon inlet port and a pump inlet port, a thermosiphon tube in the water tank having a first end in a bottom portion of the water tank communicating with the thermosiphon inlet port such that all water flowing through the thermosiphon inlet port flows into the thermosiphon tube and a second end in a top portion of the water tank, and a condenser tube in the water tank, at least a portion of the condenser tube surrounded by the thermosiphon tube to define a water flow channel between the thermosiphon tube and the condenser tube, the water flow channel having a first end at the first end of the thermosiphon tube and a second end at the second end of the thermosiphon tube;
moving a refrigerant through a refrigeration cycle including through the condenser tube, the condenser tube being at an elevated temperature compared to water temperature in the water flow channel due to the refrigerant cycle;
flowing water, by a water pump, through the water flow channel,
wherein flowing water includes drawing water from the water tank through the pump inlet port by the water pump and generating forced water flow through the thermosiphon inlet port such that the entire forced water flow flows through the water flow channel;
heating water within the water flow channel via an exchange of heat from the condenser tube; and
delivering the heated water from the water flow channel into the top portion of the water tank through the second end of the thermosiphon tube.

14. The method of claim 13, wherein the heated water is delivered to a corresponding volume within the water tank based on a temperature of the heated water, the volume being one of a plurality of volumes distributed based on thermal stratification of water within the water tank.

15. The method of claim 14, wherein the thermosiphon tube defines a plurality of openings, wherein each of the openings corresponds to one of the plurality of volumes to communicate the water flow channel with each of the volumes, and wherein the heated water enters the volume via a corresponding one of the openings.

16. The method of claim 14, wherein the temperature of the heated water is equal to or greater than a temperature of water within the volume to which the heated water is delivered.

17. The method of claim 13, further comprising flowing water from the bottom portion of the water tank into the water flow channel to provide water to the water flow channel when a temperature of water in the water tank drops below a set point and water is not being drawn from the water tank.

18. The method of claim 13, wherein flowing water through the water flow channel includes flowing the water through a coil section of the thermosiphon tube within the bottom portion of the water tank.

19. The method of claim 18, wherein flowing water through the water flow channel includes flowing the water through a straight section of the thermosiphon tube extending from the coil section toward the second end.

20. The method of claim 13, further comprising heating water within the water tank with an electric heating element if a temperature of the water within the water tank drops below a set point.

21. The method of claim 13, wherein the refrigerant moves through the condenser tube in an opposite direction to the water flowing through the water flow channel.

* * * * *